United States Patent
Swinbanks

[11] Patent Number: 5,838,802
[45] Date of Patent: Nov. 17, 1998

[54] APPARATUS FOR CANCELLING VIBRATIONS

[75] Inventor: Malcom Swinbanks, Cambridge, United Kingdom

[73] Assignee: Gec-Marconi Limited, Middlesex, United Kingdom

[21] Appl. No.: 808,155

[22] Filed: Feb. 28, 1997

Related U.S. Application Data

[63] Continuation of Ser. No. 502,323, Jul. 13, 1995, abandoned.

[30] Foreign Application Priority Data

Jul. 18, 1994 [GB] United Kingdom .................. 9414484
Aug. 4, 1994 [GB] United Kingdom .................. 9415763

[51] Int. Cl.$^6$ .............................. A61F 11/06; H03B 29/00
[52] U.S. Cl. ............................................. 381/71.2; 381/71.1
[58] Field of Search ................................. 381/71.1, 71.4, 381/71.2, 71.12, 94.1

[56] References Cited

U.S. PATENT DOCUMENTS

| | | |
|---|---|---|
| 5,233,540 | 8/1993 | Anderson et al. . |
| 5,309,378 | 5/1994 | Beierle . |
| 5,416,845 | 5/1995 | Shen ................................... 381/71.12 |
| 5,524,057 | 6/1996 | Akiho ...................................... 381/71 |

FOREIGN PATENT DOCUMENTS

| | | |
|---|---|---|
| 43565 | 1/1982 | European Pat. Off. . |
| 2054999 | 2/1981 | United Kingdom . |
| 2107960 | 5/1983 | United Kingdom . |
| 2255256 | 10/1992 | United Kingdom . |
| 2265277 | 9/1993 | United Kingdom . |
| 2271908 | 4/1994 | United Kingdom . |
| WO8803341A | 5/1988 | WIPO . |
| WO8906877A | 7/1989 | WIPO . |
| WO91/10226 | 7/1991 | WIPO . |
| WO94/09480 | 4/1994 | WIPO . |

OTHER PUBLICATIONS

Qun Shen et al., "Frequency–Domain Adaptive Algorithms For Multi–Channel Active Sound Control", Second Proceedings on Recent Advances in Active Noise and Vibrations Control, Apr. 1993.

*Primary Examiner*—Minsun Oh Harvey
*Attorney, Agent, or Firm*—Spencer & Frank

[57] ABSTRACT

An apparatus for cancelling vibrations includes a reference signal representative of the vibrations to be cancelled, an adaptive control filter producing an output signal based on the reference signal, and an actuator responsive to the output signal to produce vibrations which destructively interfere with the vibrations to be cancelled. The adaptive control filter comprises a circuit for transforming the reference signal into its frequency components, a processor for applying weights to these frequency components, and another circuit for combining the weighted frequency components to provide the output signal of the adaptive control filter. The circuit for transforming utilizes N integer updates of the reference signal to resolve the reference signal into its frequency components. Further, the circuit for transforming is updated n times between successive transformations of the reference signal into its frequency components, where 1<n<N. Moreover, the weights applied by the processor of the adaptive control filter are constrained so that the operation of the adaptive control filter in the frequency domain is substantially equivalent to that of an m weight domain filter, where m is less than or equal to N−n+1.

7 Claims, 1 Drawing Sheet

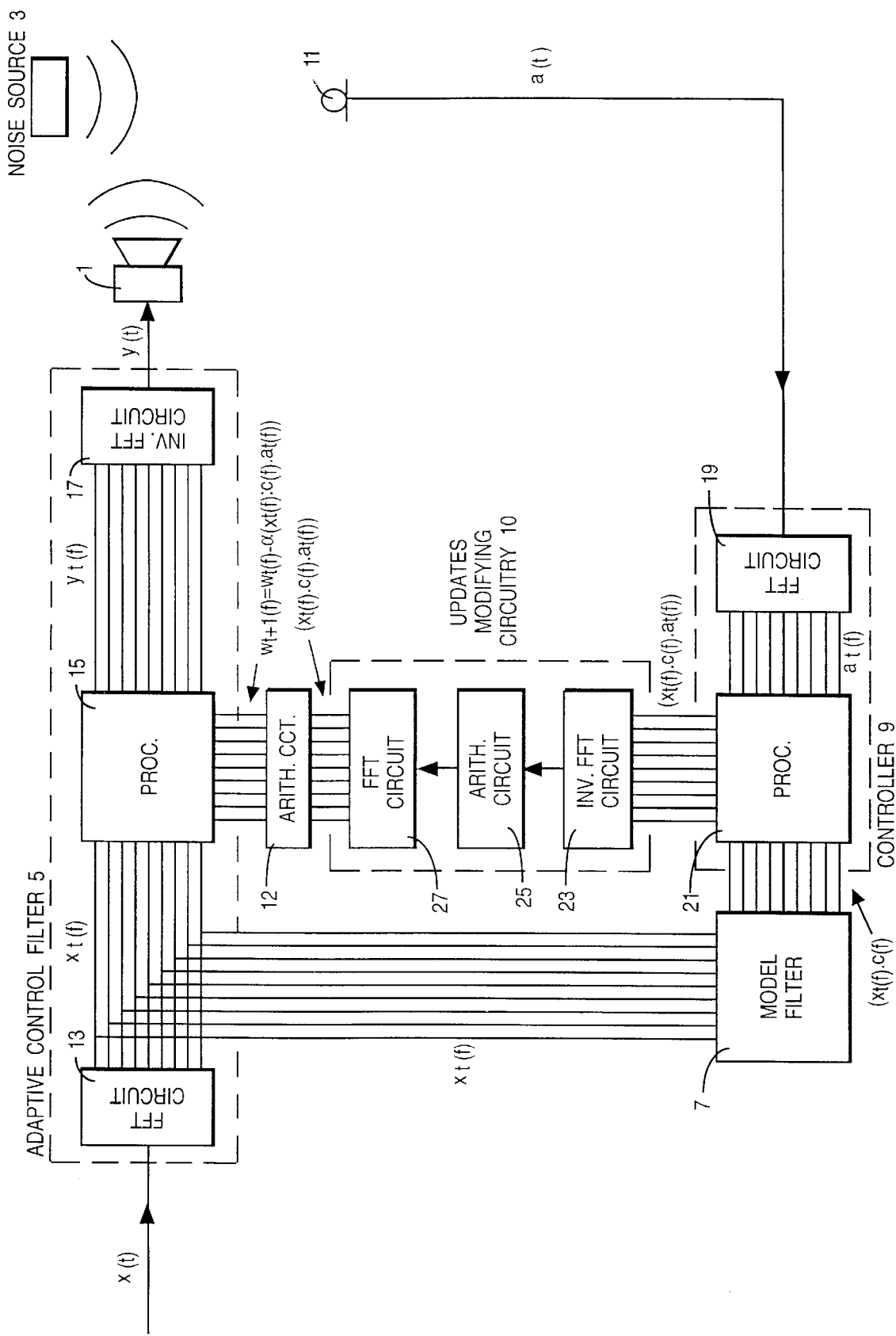

APPARATUS FOR CANCELLING VIBRATIONS

This application is a continuation of application Ser. No. 08/502,323, filed Jul. 13, 1995.

FIELD OF THE INVENTION

This invention relates to an apparatus cancelling vibrations, whether in a gas, liquid or solid.

BACKGROUND OF THE INVENTION

It is known to cancel vibrations by obtaining a reference signal representative of the vibrations to be cancelled, inverting this signal, and using the inverted signal to cause vibrations in anti-phase with the vibrations to be cancelled, which interfere therewith, thereby to effect the cancellation.

It is further known to resolve the reference signal into its frequency components, appropriately filter these components, and combine the filtered components to provide the signal which causes the anti-phase vibrations. The filtering in the frequency domain effects the required phase inversion, and may also be used to further refine the interfering vibrations so that complete cancellation is achieved. By choosing frequency domain rather than time domain control, the control is effectively diagonalised, thereby making for much faster adjustment. The controls can be adjusted in pairs (in-phase and quadrature) for each center frequency, without interaction with neighbouring controls as in time domain control.

GB-2054999-A, EP-43565-A1, and GB-2107960-A disclose examples of apparatuses for cancelling vibrations which employ frequency domain filtering. However, in each, for successful operation, either the vibrations to be cancelled must be periodic and the resolving into the frequency components synchronized to this periodicity, or, in the case where the vibrations are random (aperiodic), the resolving into the frequency components must be a continuously updated process.

SUMMARY OF THE INVENTION

According to the present invention there is provided an apparatus for cancelling vibrations comprising: means for providing a reference signal representative of the vibrations to be cancelled; filter means comprising means for resolving the reference signal into its frequency components, means for applying weights to these frequency components, and means for combining the weighted frequency components to provide an output signal of said filter means; and actuator means responsive to said output signal to produce vibrations which destructively interfere with the vibrations to be cancelled, said means for resolving utilizing N updates of said reference signal to resolve it into its frequency components, said means for resolving being updated by n times between successive resolutions of the reference signal into its frequency components where 1<n<N, there being a correlation between the weights applied by said means for applying so as to reduce discontinuity in the operation of said filter means.

The invention arose in the making of an apparatus for cancelling vibrations employing frequency domain filtering. It was decided that block processing be used by the frequency domain filter to improve the processing efficiency of the to apparatus, i.e. the filter would take a block of data, rather than just one sample, and process it all in one go to provide a number of sequential outputs. First trials of the apparatus were not successful, since it was found that in two cases the filter outputs were to discontinuous. In the first case, the vibrations to be cancelled were periodic, and the resolving into the frequency components was not synchronized to this periodicity. In the second case, the vibrations where random. Even when attempting to cancel a pure tone not synchronized, in addition to the production of the cancelling tone, unwanted side bands were produced.

It was realized that a correlation could be introduced between the frequency domain filter weights that would greatly reduce the discontinuity of the filter outputs in the aforementioned two cases. Thus, contrary to that situation apparently the most desirable that there be complete freedom to adjust the weights independently to achieve the best cancellation of vibrations, it was determined that the correlation between the weights was desirable where independent adjustment was no longer possible.

BRIEF DESCRIPTION OF THE DRAWING

An apparatus for cancelling vibrations in accordance with the present invention will now be described, by way of example, with reference to the accompanying drawing which is a block schematic diagram of the apparatus.

DETAILED DESCRIPTION OF THE INVENTION

The apparatus is for cancelling engine noise in an aircraft cabin.

Referring to the drawing, the apparatus includes a loudspeaker 1 located in the region of the aircraft cabin where it is desired that the noise produced by an engine 3 be cancelled. The loudspeaker 1 produces the aforementioned interfering anti-phase vibrations. The apparatus further includes an adaptive control filter 5, a model filter 7, a controller 9, updates modifying circuitry 10, an arithmetic circuit 12, and an error microphone 11, which microphone 11 is located in the aforementioned region of the aircraft cabin. Control filter 5 comprises a fast Fourier transform (FFT) circuit 13, a processor 15, and an inverse FFT circuit 17. Controller 9 comprises an FFT circuit 19 and a processor 21. Updates modifying circuitry 10 comprises inverse FFT circuit 23, an arithmetic circuit 25, and an FFT circuit 27.

A reference signal x(t) representative of the noise to be cancelled at time t is supplied to control filter 5. This signal may be obtained from a microphone located in the aforementioned region of the aircraft cabin, or by means of a tachometer from the aircraft engine 3 itself.

FFT circuit 13 Fourier transforms x(t) from the time domain to the frequency domain and provides to processor 15 a plurality of frequency components $x_f(f)$ of x(t). Processor 15 multiplies each $x_f(f)$ by an appropriate weight (see below) and produces. Let the resulting frequency components $y_f(f)$. Processor 15 provides the $y_f(f)$ to inverse FFT circuit 17. Circuit 17 inverse Fourier transforms the $y_f(f)$ from the frequency domain to the time domain to provide to loudspeaker 1 an appropriate driving signal y(t) to cancel the noise.

The weights utilized by processor 15 perform, amongst other things, a phase inversion of x(t) to provide the interfering anti-phase signal. An explanation of the derivation of the weights utilized by processor 15 will now be given.

Error microphone 11 detects any residual noise remaining after interference between the primary noise produced by noise source 3 and the interfering sound produced by loudspeaker 1. A signal e(t) representative of this residual noise passes from microphone 11 to FFT circuit 19 of controller 9 where it is Fourier transformed from the time domain to the frequency domain. FFT circuit 19 provides to processor 21 a plurality of frequency components $e_i(f)$ of $e(t)$.

Returning to the frequency components $x_i(f)$ provided by FFT circuit 13, each of these components also passes to model filter 7, where it is multiplied by a frequency dependent function C(f). C(f) is the transfer function from loudspeaker 1 to microphone 11, and it is necessary that this function be involved in the derivation of the weights utilized by processor 15 to take account of the physical path from loudspeaker 1 to microphone 11 within the aircraft cabin. To explain, microphone 11 is detecting the residual noise at a different physical location within the aforementioned cabin region to the physical location where loudspeaker 1 is attempting to eliminate this residual noise. Thus, any attempt to eliminate the residual noise at one location by the generation of interfering sound at another different location must take into account the physical path travelled by the sound between the locations. C(f) is a previously determined transfer function which describes the change which the physical path within the cabin from loudspeaker 1 to microphone 11 will have on the passage of sound therealong The frequency components $x_i(f).C(f)$, resulting after the multiplication of $x_i(f)$ by C(f), pass to processor 21 of controller 9, where each is multiplied by a respective frequency component $e_i(f)$ from FFT circuit 19. The resulting frequency components or provisional filter updates $x_i(f).C(f).e_i(f)$ are supplied by processor 21 to updates modifying circuitry 10. After further processing by circuitry 10 (further details of which will be given later), the actual filter updates $(x_i(f).C(f).e_i(f))'$ are supplied to arithmetic circuit 12. Circuit 12 calculates the new weights for adaptive control filter 5 according to the equation:

$$w_{i+1}(f)=w_i(f)-\alpha.(x_i(f).C(f).e_i(f))' \qquad (1),$$

where $w_{i+1}(f)$ is the new weight, $w_i(f)$ is the previous weight and $\alpha$ is a convergence coefficient. Circuit 12 passes the new weights to processor 15 of control filter 5.

Thus, the weights utilized by control filter 5 phase invert the reference representative of the noise, attempt to eliminate detected residual noise, and take into account the physical path from the actuator which produces the cancelling sound to the detector which detects residual noise.

For correct operation of the apparatus, the operation of control filter 5 must take into account the filter settling time, otherwise discontinuous filter outputs result.

For a conventional filter operating on running data, as each new data sample is taken in a new filtered output is calculated. The processing efficiency of such filters can be improved by the use of block processing. For block processing a block of data is taken and processed all in one go to provide a number of sequential outputs. A delay (the block update refresh time) is necessarily involved, but, if it can be tolerated, the advantage is greater processing efficiency.

For a block of N data samples, if it is desired to obtain n<N accurate output data, one must consider that any filtering operation requires the filter output to settle. If the filter is an m point or weight filter, then the first m−1 data outputs are inaccurate, and only once m data samples have been filtered does the output become accurate. Thus, to provide n valid data output after the filter has settled. it is required that (m−1)+n≦N, i.e. m≦N−n+1. Thus, the constraint m≦N−n+1 must be observed by the filter to provide n valid data ouput. If N=128 and n=32 then m≦97, and the filter must have 97 or fewer weights.

Returning to control filter 5, with regard to the previous values for N and n, if the size of the FFT performed by circuit 13 of control filter 5 is 128 samples, each FFT performed by circuit 13 is performed on 128 samples of reference signal $x(t)$. Thus, 64 complex frequency components $x_i(f)$ of $x(t)$ are presented to processor 15 where each is multiplied by its respective weight $w_i(f)$. The resulting 64 complex frequency components $y_i(f)$ are passed to inverse FFT circuit 17 where they are inverse transformed to 128 'samples' of $y(t)$. Let the number of samples of $x(t)$ by which FFT circuit 13 is updated between the performance of successive FFTs be 32. Thus, at each update, 32 samples of $x(t)$ are taken control by filter 5, and 32 samples of $y(t)$ are provided by control filter 5.

For control filter 5 to provide n valid data output, it must observe the constraint m≦N−n+1. Since N=128 and n=32, m≦97. The constrained weights applied by control filter 5 are obtained as follows.

The aforementioned provisional updates $x_i(f).C(f).e_i(f)$ are passed by processor 21 to inverse FFT circuit 23 of updates modifying circuitry 10, where they are inverse Fourier transformed from the frequency domain to the time domain and provided to arithmetic circuit 25 as the equivalent of 128 time domain updates. Arithmetic circuit 25 sets to zero the last 31 (128−97) of these 128 updates so as to effectively leave 97 updates for a 97 weight filter. The last 31 updates are set to zero since it is the 97th (mth) data output that is the first accurate data output (see above). Further N−m or N−(N−n+1) (taking the limit where the least updates are set to zero giving the greatest flexibility for control filter 5) or n−1 updates are set to zero. The resulting updates are passed to FFT circuit 27 where they are Fourier transformed from the time domain to the frequency domain to provide to arithmetic circuit 12 the actual constrained frequency domain updates $(x_i(f).C(f).e_i(f))'$. Circuit 12 calculates the new constrained weights according to equation (1). Thus, a correlation is introduced between the weights of control filter 5, and it is now a necessary requirement that the weights of control filter 5 are not adjusted independently to achieve the best cancellation of noise. In other words when adjusting one weight regard must be had to the other weights.

There are three conditions which relate to the aforementioned m≦N=n+1 constraint which require special consideration. The three conditions will be considered respectively in the following three paragraphs.

For the m≦N−n+1 constraint when n=1 (i.e. a running, continuously updated filter), m≦N, and m is permitted to equal N. Therefore there is no constraint, and no updates need to be set to zero for successful operation.

For the FFT process performed by FFT circuit 13 of the apparatus, the FFT process effectively assumes periodic behavior and, i.e. it fits a set of periodic functions to the data samples on the assumption that the data is periodic outside the N sample block. Thus, if the data is indeed truly periodic on the block length, the FFT process will always be accurate without the need to observe the m≦N−n+1 constraint. Therefore, when the vibrations to be cancelled are periodic, and the resolving of the reference signal representative of these vibrations into its frequency components is synchronized to this periodicity, then constraint for successful operation is not required. In all other circumstances (i.e., when the data is periodic and there is no synchronization, or when the data is random), constraint for successful operation is required, unless, of course, as explained above (see previous paragraph), the resolving into the frequency components is a continuously updated process, when no constraint is required.

For the $m \leq N-n+1$ constraint when $n=N$, if the number of samples by which FFT circuit 13 is updated between successive Fourier transformations equals the size of the FFT performed by circuit 13, then $m=1$, and all the updates apart from the first must be set to zero. Such a severe constraint results in a filter which is of very little use at all, and the consequent requirement is that the data must be constrained instead to be periodic on the length scale N of the FFT.

Thus, for block processing (and its associated advantages), n is greater than 1 and constraint for correct operation is required (unless the data is periodic and synchronized). However, when $n=N$ the constraint is so severe that for useful operation the data must be periodic and synchronized, and useful operation is not possible when the data is random and $n=N$. Therefore, in the limit, the range $1<n<N$ remains.

The choice of the precise update to use in the range $1<n<N$ depends on the nature of the vibrations to be cancelled. If the vibrations are in the main random, then it is best to choose n from the lower end of the range (i.e., the end approaching 1), since the updating is then sufficiently fast to manage the rapidly changing random vibrations. There is, of course, a consequent penalty in processing efficiency. If the vibrations are in the main narrow band or tonal (i.e., the vibrations comprise a series of reasonably discrete frequencies which, if they change, change only slowly), then n may be chosen from the upper end of the range (i.e., the end approaching N) with a consequent benefit in processing efficiency. Of course, if the change in discrete frequencies occurs more quickly, then, in effect, random noise is approached, and a lower value of n must be chosen. A further factor affecting the choice of n is, of course, the flexibility required in the choice of weights for the filter. As explained above, larger n requires greater constraint on the filter weights.

It is to be appreciated that the process of inverse Fourier transformation, truncation, and Fourier transformation performed by updates modifying circuitry 10 could be approximated by a simpler convolution operation performed entirely in the frequency domain. Arithmetic circuit 25 of circuitry 10 uses a 97 point truncation step-function, and points 1 to 97=1 and points 98 to 128=0. However, the disadvantage is that the corresponding convolution window involves complex, asymmetric coefficients. Yet, if a reduced 64 point truncation step-function is used, and points 1to 64=1 and points 65 to 128=0 (where, the $m \leq N-n+1$ constraint is still observed) then, the advantage would be that the corresponding convolution window is symmetric, and a simple 5-point convolution would suffice.

It is also to be appreciated that the resolving of the reference signal into its frequency components need not be by means of Fourier transformation and other processing, for example frequency sampling filtering, could be used.

What is claimed is:

1. An apparatus for cancelling vibrations comprising:
   means for providing a reference signal representative of the vibrations to be cancelled;
   filter means comprising
      means for resolving the reference signal into its frequency components;
      means for applying weights to said frequency components to obtain weighted frequency components; and
      means for combining the weighted frequency components to provide an output signal of said filter means; and
   actuator means responsive to the output signal of said filter means to produce vibrations which destructively interfere with the vibrations to be cancelled, said means for resolving utilizing N updates of said reference signal to resolve said reference signal into its frequency components, said means for resolving being updated n times between successive resolvings of the reference signal into its frequency components where $1<n<N$, the weights applied by said means for applying being constrained so that the operation of said filter means in the frequency domain is substantially equivalent to that of an m weight time domain filter where $m \leq N-n+1$ and where N, n, and m are positive integers.

2. An apparatus according to claim 1 wherein: said means for resolving comprises first Fourier transform means; and said means for combining comprises first inverse Fourier transform means.

3. An apparatus according to claim 2 further comprising:
   means for deriving provisional updates to said weights applied by said means for applying;
   means for modifying said provisional updates to provide actual updates; and
   means for utilizing the actual updates to calculate the constrained weights applied by said means for applying, said constraint on the weights applied by said means for applying being introduced by the modification carried out by said means for modifying.

4. An apparatus according to claim 3 wherein said means for modifying comprises:
   second inverse Fourier transform means for transforming said provisional updates from the frequency domain to the time domain to provide equivalent time domain updates;
   means for setting to zero the last n−1 updates of said equivalent time domain updates to obtain resultant time domain updates thereby to provide time domain updates for a m weight time domain filter where m equals N−n+1; and
   second Fourier transform means for transforming the resultant time domain updates from the time domain to the frequency domain to provide said actual updates.

5. An apparatus according to claim 3 wherein the modification carried out by said means for modifying comprises a convolution operation in the frequency domain.

6. an apparatus according to claim 3 wherein said for deriving provisional updates comprises:
   detector means for detecting any residual vibrations remaining after said destructive interference and providing an output signal representative thereof,
   further Fourier transform means for transforming the output signal of said detector means from the time domain to the frequency domain thereby to resolve the output signal into its frequency components,
   model filter means for multiplying the frequency components of said reference signal by a frequency dependent function which is a transfer function from said actuator means to said detector means thereby to provide modelled frequency components, and
   means for multiplying said modelled frequency components by the frequency components of the output signal of said detector means to provide said provisional updates; and
   said means for utilizing the actual updates calculates said constrained weights applied using the equation:

$$w_{t+1}(f) = w_t(f) - \alpha . (x_t(f).C(f).e_t(f))'$$

where $w_{t+1}(f)$ are the calculated constrained weights, $w_t(f)$ are previous constrained weights, $\alpha$ is a convergence coefficient, and $(x_r(f).C(f).e_r(f))'$ are said actual updates where $x_r(f)$ are the frequency components of the reference of the reference signal, $C(f)$ is said transfer function; and $e_r(f)$ are the frequency components of the output signal of the detector means.

7. An apparatus for cancelling vibrations comprising:

means for providing a reference signal representative of the vibrations to be cancelled;

filter means comprising means for resolving the reference signal into its frequency components;

means for applying weights to said frequency components to obtain weighted frequency components; and means for combining the weighted frequency components to provide an output signal of said filter means; and actuator means responsive to the output signal of said filter means to produce vibrations which destructively interfere with the vibrations to be cancelled;

means for providing a residual noise signal representative of vibrations being cancelled;

means for processing the residual noise signal and the frequency components of the reference signal to produce provisional frequency domain updates;

means for modifying the provisional frequency domain updates to obtain constrained frequency domain updates; and means for processing the constrained frequency domain updates to obtain the weights utilized by said means for applying in the filter means.

\* \* \* \* \*